Sept. 5, 1967            N. K. WESLEY            3,339,997
BIFOCAL OPHTHALMIC LENS HAVING DIFFERENT COLOR
DISTANCE AND NEAR VISION ZONES
Filed July 30, 1962            2 Sheets-Sheet 1
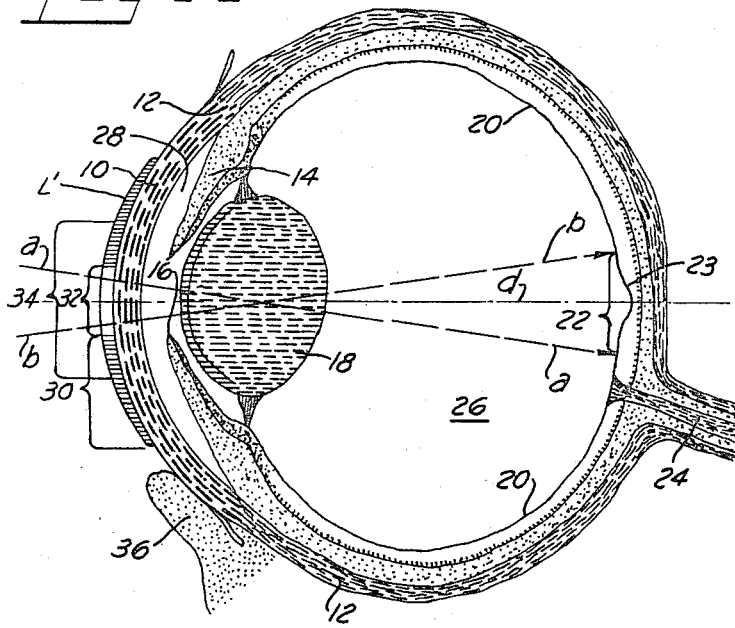
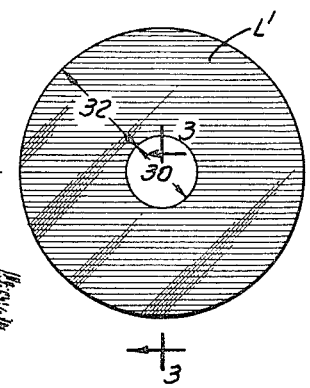
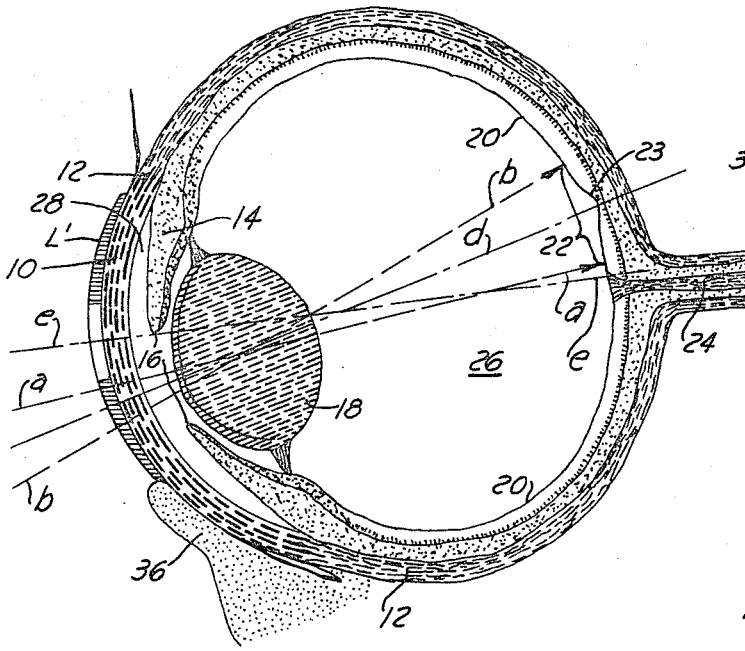
INVENTOR
NEWTON K. WESLEY
BY *Bair, Freeman & Molinare*
ATTORNEYS Sept. 5, 1967               N. K. WESLEY               3,339,997
BIFOCAL OPHTHALMIC LENS HAVING DIFFERENT COLOR
DISTANCE AND NEAR VISION ZONES
Filed July 30, 1962                             2 Sheets-Sheet 2
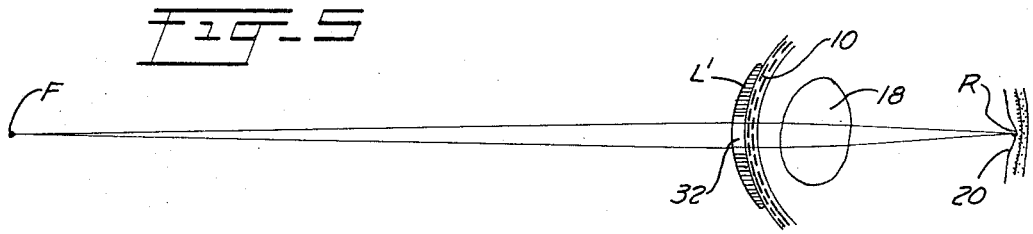
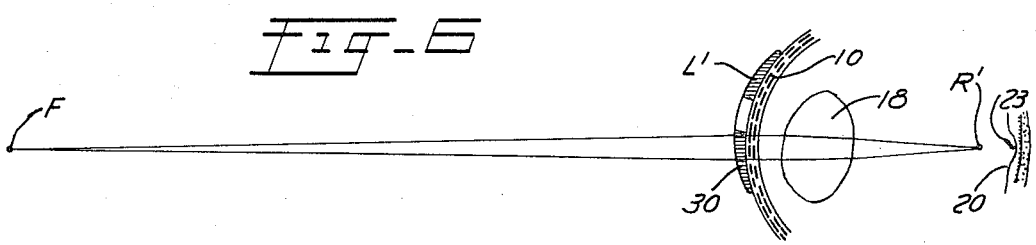
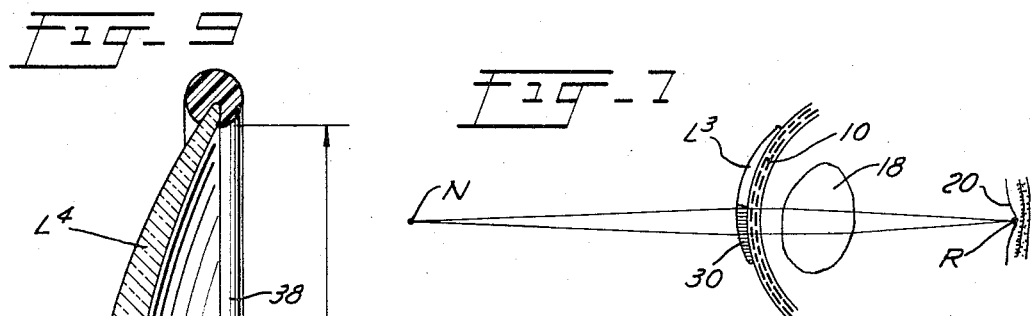
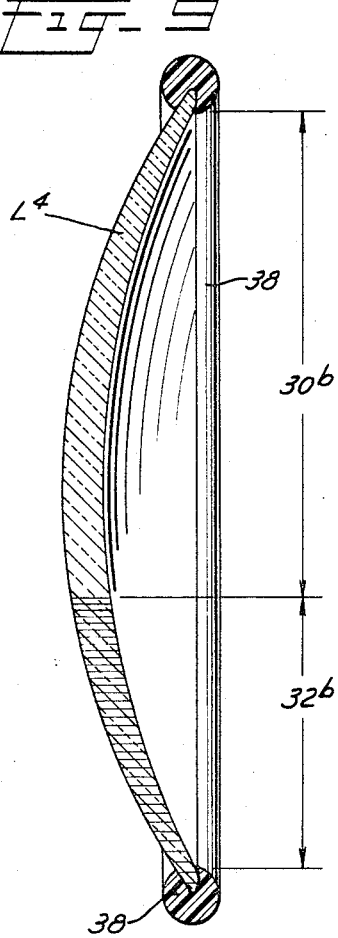
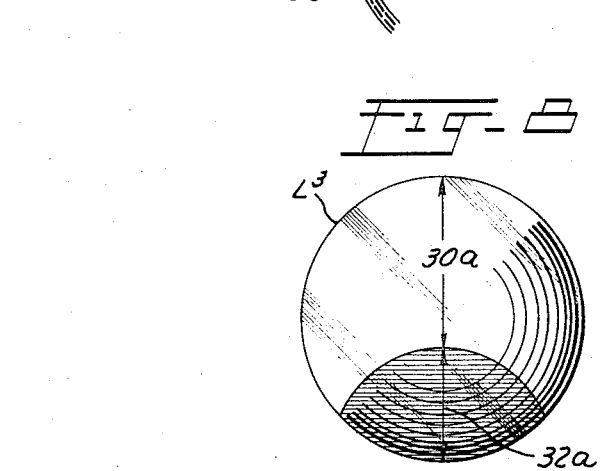
INVENTOR
NEWTON K. WESLEY
BY Bair, Freeman & Molinare
ATTORNEYS United States Patent Office 3,339,997
Patented Sept. 5, 1967

3,339,997
BIFOCAL OPHTHALMIC LENS HAVING DIFFERENT COLOR DISTANCE AND NEAR VISION ZONES
Newton K. Wesley, Chicago, Ill., assignor to The Plastic Contact Lens Company, a corporation of Illinois
Filed July 30, 1962, Ser. No. 213,210
4 Claims. (Cl. 351—161)

This invention relates to a lens for correcting the vision of a patient, and particularly to a bifocal lens utilizing color as a means to secure a near vision effect in a lens which otherwise has a prescription for the far vision of the patient.

One object of the invention is to provide a lens which may be designed as either a spectacle lens or a contact lens (either scleral or corneal type) having a far zone and a near zone which are powered for distance viewing of the patient, but in which the near zone is characterized by being colored to thereby operate to focus rays from a source through the near zone at a shorter distance in the eye than rays from such source through the far zone, thereby securing a bifocal effect by the use of color in the near zone.

Another object is to provide such a lens which is a corneal contact lens so fitted to the eye as to result in distance vision through the far zone of the lens when the patient is looking ahead in the normal manner but which shifts in relation to the cornea so that central vision of the eye shifts from the far zone to the near zone when the eye is downcast as for reading, the color in the near zone being thereupon operable to secure in effect a greater magnification of the object being viewed due to chromatic aberration of the eye.

Still another object is to provide the lens when of corneal character with a near zone which is an outer zone of annular shape entirely surrounding the far zone whereby the outer zone is equally effective for near vision in all positions of rotation of the lens with respect to the cornea.

A further object is to provide for increasing the differential in doptric power as between the far zone and the near zone by selecting a color in the lower wavelength half of the visible spectrum for the near zone and selecting a color in the upper half of the visible spectrum for the far zone.

Still a further object is to provide a bifocal lens having one or both zones colored, the power of a colored zone being obtained by a combination of physical curvature and color in which the color used and the chormatic aberration of the eye are taken into consideration and the curvature of the lens surface is formed accordingly.

An additional object is to provide a bifocal lens that can be made thinner than otherwise when color is used in either or both the far and near zones of the lens to provide a magnification effect resulting from chromatic aberration of the eye.

With these and other objects in view, my invention consists in a bifocal lens of such character as to achieve the objects above contemplated, as hereinafter more fully set forth, pointed out in my claims and illustrated in detail on the accompanying drawings, wherein:

FIG. 1 is a vertical diagrammatic cross section through the human eye showing a typical form of my bifocal lens applied as a corneal contact type of lens in wearing position on the cornea with the eye looking straight ahead for central vision through the far zone of the lens;

FIG. 2 is a front elevation of the lens shown in FIG. 1;

FIG. 3 is an enlarged sectional view on the line 3—3 of FIG. 2 showing a modification;

FIG. 4 is a sectional view somewhat similar to FIG. 1 in which the eye is shifted to a downcast position and the near zone of the lens is in operation as far as central vision is concerned;

FIG. 5 is an optical diagram following FIG. 1 and showing the focusing of a far object on the retina of the eye after passing through the far zone of the lens;

FIG. 6 is a similar diagram following FIG. 4 and showing the focusing effect from the far object when viewed through the near zone of the lens;

FIG. 7 is a similar diagram following FIG. 4 and showing the focusing of a near object through the near zone onto the retina;

FIG. 8 is a front elevation of a modified form of my bifocal lens, and

FIG. 9 is a vertical sectional view of my bifocal lens of suitable size for mounting in a spectacle frame.

On the accompanying drawing I have used the reference numeral 10 to indicate in general the cornea of the eye. The cornea has a central apical area which is substantially spherical and a peripheral area surrounding the central area which departs from the spherical shape of the apical area, being somewhat flatter or of greater radius, the radius increasing (but somewhat irregularly) away from the apical area.

Surrounding the cornea 10 is the sclera 12 or white portion of the eye. The transition from cornea to sclera is the limbus which defines the limbal area within which a corneal contact lens is usually positioned. Just back of the cornea 10 is the iris or diaphragm 14 which defines the iris opening or pupil 16. The sensory end organ of the eye is the retaina 20 which includes a central vision area 22 comprising a group of visual cells surrounding a central optical rod or rhabdom 23 (which is usually termed the foveal centralis). The rest of the retaina 20 involves peripheral vision.

Man has "camera" eyes including a crystalline lens 18 suspended between the chamber 26 containing vitreous humour and a chamber 28 containing aqueous humour. The rear of the chamber 26 is lined with the retina 20. The cornea 10 acts as a lens in front of the chamber 28 and of course is transparent, its apparent color being that of the iris 14. The iris is activated by muscles which control the size of its central opening or pupil 16 through which light enters the eye. Light passing through the lens 18 is focused on the retina as an image and the varied stimuli act on nerve endings of the retina to result in a definite mental image transmitted to the brain by the optic nerve 24. The eyes are provided with muscles which direct them toward objects to be observed. They also have muscular focusing devices which control the curvature of the lens 18 and thus its focus with respect to the retina.[1]

In FIG. 1 I have shown a lens L¹ embodying my invention fitted to the cornea, and in FIG. 9 a similar lens L⁴ embodying my invention but mounted in a spectacle frame. I will first describe the lens L¹ and the action thereof whereupon the same action for the lens L⁴ will be obvious.

The lenses L¹, L³ and L⁴ are shown as having far zones 30, 30a and 30b and near zones 32, 30b and 32b respectively. They may be made of plastic material such as methylmethacrylate but the near zone is colored (such as blue) whereas the far zone 30 is clear plastic. A colored near zone gives a bifocal effect as will hereinafter appear.

A corneal contact lens may be designed to operate with bifocal action in accordance with my Patent No. 3,031,927. Briefly the posterior surface of the lens is curved to fit the cornea of the patient to which the lens is applied with a tendency to remain centered thereon. Such a fit involves a posterior radius of curvature approx- ---
[1] Van Nostrand's Scientific Encyclopedia, 2nd ed., 1947, page 555.

imating that of the central portion of the cornea, such curvature extending throughout at least the optical portion of the lens represented by the bracket 34 in FIG. 1. The curvature of the posterior surface beyond this optical portion may be of a greater radius to fit the somewhat flatter portion of the cornea outside of the apical area thereof and to provide clearance between the lens edge and the cornea to facilitate upward shifting movement of the lens when the eye moves to a downcast position. The anterior surface of the lens is formed with a curve of another radius so related to the posterior curve that the desired power for distance vision is had through the far zone 30 of the lens. By then making the near zone 32 colored, somewhere in the range of colors of the visible spectrum between 4,000 and 5,500 Angstrom units (A.U.), a bifocal effect is secured due to chromatic aberration of the eye. The lens $L^1$ is also of such diameter, greater than the normal pupil size and less than the limbal area of the eye, and has its lower peripheral edge normally positioned adjacent but spaced above the upper edge of the lower eyelid 36 when the lens is centered on the cornea and the patient is looking straight ahead as in FIG. 1, the lens of course being adapted to be retained on the cornea of the eye by capillary attraction produced by a lacrimal layer between the lens and the cornea in the usual manner of contact lenses.

To illustrate the action of the lens in FIG. 1, rays of light $a$ and $b$ are illustrated impinging the far zone 30 and passing through the lenses $L^1$ and 18 to impinge the retinal area 22 and correct for far-sightedness with respect to distant objects. Referring to FIG. 2 it will be noted that the far zone 30 is illustrated as circular (but may be of other shapes as desired) and the near zone 32 is in the form of an outer zone of annular shape entirely surrounding the far zone so as to be equally effective for near vision in all positions of rotation of the lens with respect to the cornea. For proper bifocal action, the diameter of the far zone should approximate 3 mm. to 6 mm. for the majority of patients.

The lens $L^1$ is illustrated as a composite lens in which the near zone 32 is shaded with horizontal lines to indicate the color blue, being formed of a blue plastic with a circular center opening in which the far zone 30 formed of clear plastic material is fused prior to cutting the anterior and posterior surfaces of the lens.

Instead of the construction just described, a clear lens such as illustrated at $L^2$ in FIG. 3 may be used and a zone 32 provided for near vision by tinting the lens (indicated by stippling 32a) by the use of dye or the like on one or both surfaces thereof.

Since the use of color produces a bifocal effect because of chromatic aberration of the eye, it is not necessary to cut different curvatures for near and far prescription as in my Patent No. 3,031,927 providing the prescription does not exceed certain low dioptic values. First, however, describing the bifocal action of the lens, reference is made to FIG. 5 wherein rays from a far subject indicated F pass through the far zone 30 of the lens $L^1$ and focus on the retina 20 at R.

Next comparing FIG. 4 with FIG. 1 the action of the lens $L^1$ is shown when the eye is downcast as when reading. On some patients as the eye is rolled downwardly the lens $L^1$ has a tendency to lag on the cornea due to the force of inertia. Also the lower eyelid 36 which the lower edge of the lens engages tends to either hold the lens against rolling with the eye or provides some friction against movement of the lens with the eye as the lower margin of the lens enters between the cornea and the lower lid. By way of comparison, a center line $d$ is shown in FIG. 1 which is the axis of the eye and also of the lens $L^1$. In FIG. 4 the axis of the lens $L^1$ has shifted to $e$ compared to the axis $d$. The resulting operation is one in which the rays of light $a$ and $b$ from the object again impinge the central area 22 and in this instance it will be noted that the rays $a$ and $b$ are passing through the near zone 32 so that in effect greater magnification for near vision is now had due to the color of this zone.

Next referring to FIG. 6 the diagram of FIG. 4 has been tilted clockwise on the drawing to a position where the axis $d$ of the eye is parallel to the axis $d$ in FIG. 5, and rays of light from the same far object F at the same distance now pass through the blue part of the lens and are focused at R' instead of R because blue has a wave length of about 4,860 A.U., thus focusing through the cornea and the crystalline lens at a point short of the retina. Converted to diopters the wave length 4,860 A.U. is .5D with respect to green-yellow at 5,500 A.U. which is the average for the standard emmetropic eye and is the color that produces maximum visibility, being substantially half way between the practical limits of the visible spectrum that might be used in connection with my disclosure of the use of color as a means to secure bifocal effect. Actually the visible spectrum runs from about 3,800 A.U. at the violet end to 7,600 at the red end. Clear plastic is comparable to approximately 5,500 A.U. and accordingly the color blue gives a near vision correction of .5D.

Referring to FIG. 7 the optical action may be explained. By moving the object at F to a closer position such as N the rays of light focus on the retina at R again so that through the clear part of the lens distant vision focuses properly according to FIG. 5, and through the colored part near vision focuses properly according to FIG. 7.

Instead of a rotating corneal lens, one of the non-rotating types such as shown at $L^3$ in FIGS. 7 and 8 may be used in which the far and near zones are illustrated at 30a and 32a respectively. The lens may be formed heavier in the lower half than in the upper half to avoid such rotation or may have a toric posterior surface to fit a toric cornea as disclosed in the now abandoned copending application of Black, Ser. No. 765,553, filed Oct. 6, 1958, assigned to the assignee of the present application, and thereby prevent rotation, but the lens will act as in FIGS. 4 and 7 to secure near vision through the colored lower near zone in the same way. On the other hand, the contact lens may be of the scleral type having a colored near zone. The dividing line at the vertical axis of either type of contact lens should be 1.5 mm. to 3.0 mm. below the optical axis of the lens when centered on the cornea and the patient is looking straight ahead.

Similarly in FIG. 9 a spectacle lens $L^4$ is shown mounted in a spectacle frame 38 and having a clear upper far zone 30b and a lower near zone 32b which is colored to secure the bifocal effect by the use of color instead of by differences in surface curvature as in the usual types of bifocal lenses. Obviously the lenses $L^3$ and $L^4$ may be tinted as in FIG. 3 instead of composite as illustrated.

A lens made according to the present disclosure can be made more economically in that the powering of the surfaces are not as complicated since the same curvature can be used for both the far and near zones and this is primarily the main advantage of a lens of this type.

However, such a lens is suitable for only low dioptric differences as between the near and far zones. By way of example, a clear or green-yellow far zone and a blue near zone produces .5D of correction as above indicated. Greater correction can be secured, however, by selecting for the near zone a color of shorter wave length such as violet tending toward ultra-violet at 4,000 A.U. This would produce about 1.0D of correction.

On the other hand the spread may be increased to .9D by using blue for the near zone and red tending toward orange of about 6,560 A.U. for the far zone. In theory, as much as a 3.0D spread can be achieved through the use of violet at 4,000 A.U. for the near zone and red at 7,000 A.U. for the far zone. For some patients however there are other limitations, particularly when an attempt is made to achieve the higher dioptric values, because the colors are darker and less light therefore enters the eye. In addition to the bifocal effect of course there is the effect of all objects viewed appearing to take on the color of the lens zones. A certain degree of such coloration can be tolerated and some patients can tolerate more than others.

While the use of single curves on each of the anterior and posterior surfaces of the lens (at least in the optical area of a contact type of lens) is the main advantage of using color as disclosed, the use of color is also desirable to reduce the curvature differential between the far zone and the near zone in bifocal lenses requiring higher than 2.0 or 3.0D spread between far and near zones. Especially in the exceptionally high range, the thickness of the lens may be reduced which is of particular advantage in a corneal contact type of lens. Also for some patients, certain colors may be advantageous and may be used with suitable modification in the lens surface curvatures to compensate for the color or colors used.

The foregoing disclosure may be departed from to some extent without however departing from the real spirit and purpose of my invention, and it is my intention to cover by my claims any modified forms of structure or use of mechanical equivalents which may reasonably be included within their scope.

I claim as my invention:

1. A bifocal ophthalmic lens for correcting the vision of a patient, said lens having a far zone and a near zone of the same refractive index, said far zone characterized by being colored in the range of the longer wave-length half of the visible spectrum, the posterior surface of both zones having one common radius of curvature and the anterior surface of both zones having another common radius of curvature relative to said first radius of curvature modified to compensate for the color of said far zone to provide the required correction for distance viewing of the patient, said near zone characterized by being colored in the range of the shorter wave-length half of the visible spectrum and thereby operative to focus rays from a source through said near zone at a shorter distance in the eye than rays from said source through said far zone.

2. A lens according to claim 1 which is of corneal contact type adapted to be retained on the cornea of the eye by capillary attraction produced by a lacrimal layer between the lens and the cornea, said posterior surface being curved to fit the cornea of the patient to which the lens is applied with a tendency to remain centered thereon, said lens being of a diameter greater than the normal pupil size and less than the limbal area of the eye and having its lower peripheral edge normally positioned adjacent but spaced above the upper edge of the lower eyelid when the lens is centered on the cornea and the patient is looking straight ahead, said posterior surface having its peripheral edge formed to provide clearance between the lens edge and the cornea to facilitate upward shifting movement of the lens whereby when the eye moves to a downcast position the lens will be shifted upwardly relative to the cornea by contact of its lower edge with the upper edge of the lower eyelid, the dividing line between said far zone and said near zone being positioned so that thereupon central vision may shift from said far zone to said near zone.

3. A lens in accordance with claim 2 in which said near zone is of annular shape entirely surrounding said far zone so as to be equally effective for near vision in all positions of rotation of said lens with respect to the cornea.

4. A lens in accordance with claim 3 in which said far zone is of a diameter between 3 mm. and 6 mm.

References Cited

UNITED STATES PATENTS

| | | | |
|---|---|---|---|
| 2,207,411 | 7/1940 | Pierce | 88—111 X |
| 2,244,687 | 6/1941 | Goldsmith et al. | 88—57 |
| 3,031,927 | 5/1962 | Wesley | 88—54.5 |
| 3,034,403 | 5/1962 | Neefe | 88—54.5 |

FOREIGN PATENTS 232,284   1/1960   Australia.

DAVID H. RUBIN, *Primary Examiner.*